W. DOLGE & W. "E." DRAPER.
TAX BILL.
APPLICATION FILED NOV. 19, 1913.
1,174,000.
Patented Feb. 29, 1916.
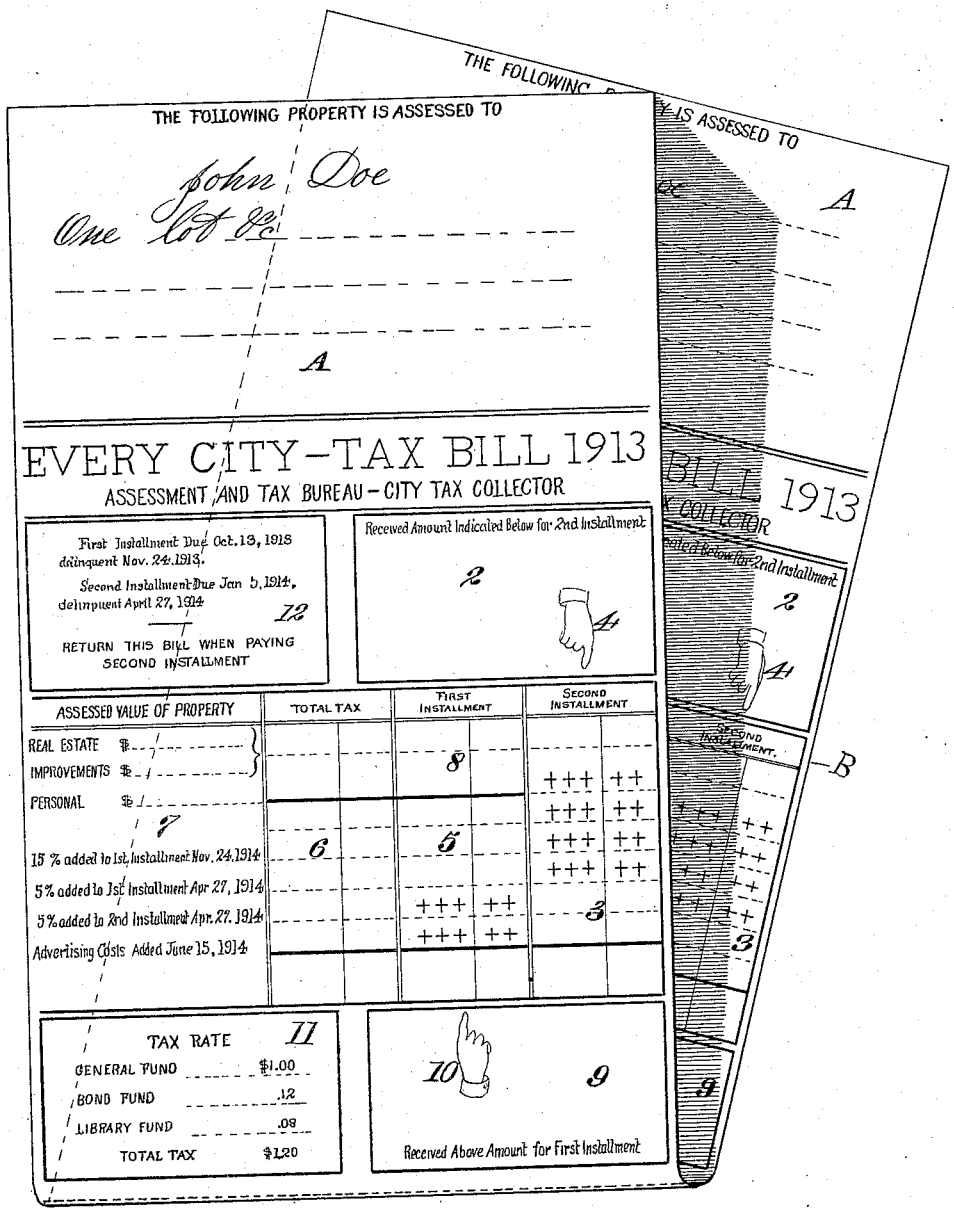
WITNESSES:
Charles Pickles
F. E. Maynard.
INVENTOR
William Dolge,
Wellington E. Draper,
BY G. H. Strong
ATTORNEY
THE COLUMBIA PLANOGRAPH CO., WASHINGTON, D. C.

UNITED STATES PATENT OFFICE.

WILLIAM DOLGE AND WELLINGTON "E." DRAPER, OF SAN FRANCISCO, CALIFORNIA.

TAX-BILL.

1,174,000.  Specification of Letters Patent.  Patented Feb. 29, 1916.

Application filed November 19, 1913. Serial No. 801,846.

*To all whom it may concern:*

Be it known that we, WILLIAM DOLGE and WELLINGTON "E." DRAPER, both citizens of the United States, residing in the city and county of San Francisco and State of California, have invented new and useful Improvements in Tax-Bills, of which the following is a specification.

This invention relates to improved tax bills for the use of municipalities, and other governing bodies.

The purposes and advantages of the invention will be noted later.

The invention consists of the parts and the combination and construction of parts as hereinafter more fully described and claimed, having reference to the drawings, in which the figure illustrates the invention.

It is notorious that most tax bills are cumbersome and antiquated, and that it takes a tremendous force, particularly in large cities, to prepare tax bills. Also it is notorious that mistakes often of a serious nature, are of altogether too frequent occurrence in making out tax bills and accounting for the public moneys represented thereby.

We have designed a tax bill of minimum proportions, and yet all the information and description required in any tax bill can be placed on this one.

Having reference to the drawing, the bill consists of a sheet having a reserved space A for the description of the property and name of the party assessed. In the present case this space A happens to be shown at the top of the sheet, but manifestly it might otherwise be placed on the sheet and the result would be the same. Below this space A is a space 2 for the receiving stamp indicating the payment of one of the instalments into which it is common to divide the payment of taxes. In the present instance, this space 2 is to indicate the second instalment, the amount of which appears in the column 3 below; the hand 4 in space 2 pointing directly to this column so that there is no mistaking which instalment the receipt shown by the receiving stamp in space 2, is intended for. Also below space 2 and alongside and in front of "second instalment" column 3 is "first instalment" column 5. Alongside of the "first instalment" column 5 and in front of it is the "total tax" column 6.

The space 7 adjoining column 6 is for the "assessed value of property" column, wherein is set out the amount of taxable real estate, improvements, personal, penalties and any special taxes, not otherwise included. The amount of tax for the real estate and improvements, and for the personal property are extended into the "total tax" column 6, then this "total tax" is apportioned to the "first instalment," and the "second instalment." As certain taxes are payable with one instalment, and not with another, we employ crosses, or other suitable marks indicated at 8, in the various columns and opposite the different items, so that it makes it impossible for a clerk to make an error by inserting figures in the wrong column. For instance, personal property tax is usually paid with the first instalment, consequently we place the crosses 8 in the "second instalment" column opposite "personal," so that all the clerk has to do is to extend his "total tax" "personal" into the "first instalment" column. Likewise, with the penalties, or special taxes, or advertising costs, etc.

Below the "first instalment" column 5, is a second receiving stamp space 9, which is adapted to receive the receiving stamp on the payment of the "first instalment" and this space 9 has a hand, or other indicator 10, pointing upward to the "first instalment" column just as the stamp receiving space 2 has a hand or indicator 4 pointing downwardly to the "second instalment" column.

Space 11 alongside of the stamp receiving space 9 may be employed to set out the segregated tax rate, and the space 12 alongside of the upper stamp receiving space 2 may be employed for any necessary instructions.

Suitably attached to this bill is a duplicate sheet B which is marked and ruled in every way identical with the original. In the present instance we have shown the duplicate sheet B as attached to the bottom of the original above described, and foldable underneath the original and imprinted on its inner side so that the imprint of the duplicate sheet B can be brought into exact registration with the corresponding spaces and notations above described in connection with said original.

A tax bill of this character possesses the following practical advantages:

1.—The size of the tax bill is reduced because of the compact way in which all the information is presented.

2.—The tax bill provides space at the head of the bill for the name and for the description of the property thus putting it in plain sight.

3.—The tax bill provides space for the assessment roll number, the name and address of the tax payer, and the description of the property in the space marked "A", in which space all this information may be printed from a plate or a stencil, or in long hand. This is not possible on present forms of tax bills.

4.—The spaces 2 and 9 for the "receiving stamp" and initial of the tax collector and the indication by an indicating finger mark or by an arrow or other means clearly indicative of the amount paid.

5.—The arrangement of the tax bill wherein the assessed valuation of real estate and improvements and personal property are shown together, in column 7, and where there is the extension of the total tax in column 6 and the tax on the first instalment and the second instalment, in the respective columns renders the tax bill self-proving because when filled out completely the footing of the total tax column will equal the footings of the second and first instalment columns.

6.—By reason of crosses 8, or other marks inserted in the columns it is impossible for a clerk to make an error by inserting figures in the wrong columns.

7.—By use of the duplicate tax bill all necessity for keeping stubs is removed and the records of the tax collector are easily susceptible to check by themselves or by other properly constituted authority.

Having thus described our invention what we claim and desire to secure by Letters Patent is—

1. A tax bill comprising a sheet having an appropriately designated space reserved at the top thereof for the description of the property and the name of the party assessed, an appropriately designated space for the assessed valuation of taxable properties with extension columns showing "total tax", "first instalment", "second instalment", indicia in the assessed valuation space indicating different kinds of property, blocked spaces in alinement with said indicia, indicia in these blocked spaces filling certain of the spaces and preventing insertions from being made therein, an appropriately designated receiving stamp space for each of said instalment columns adjacent thereto, indicators in said receiving stamp spaces pointing to the respective column represented by said particular receiving stamp space, and a detachable, duplicate bill with similarly appropriately designated spacings and notations.

2. A tax bill comprising a sheet having an appropriately designated space reserved at the top for the description of the property and name of the party assessed, an appropriately designated space below for the receiving stamp, an appropriately designated space below that for the entry of the assessed value of property giving in successive horizontal extension across the entry sheet the "total tax", "first instalment", "second instalment", a memorandum in said assessed valuation space of kinds of property and of penalties, properly alined spaces in the instalment columns for noting said amounts of said property and of said penalties, indicia in these columns preventing wrongful entry of the penalties therein, a receiving stamp space below the instalment columns, and an indicator in the first mentioned receiving stamp space pointing to one of said instalment columns, a similar indicator in the lowermost receiving stamp space pointing to the other of said instalment columns, and spaces beside each of the stamp spaces for the insertion of suitable matter.

In testimony whereof we have hereunto set our hands in the presence of two subscribing witnesses.

WILLIAM DOLGE.
WELLINGTON "E." DRAPER.

Witnesses:
JAMES MASON,
M. V. COLLINS.

Copies of this patent may be obtained for five cents each, by addressing the "Commissioner of Patents, Washington, D. C."